United States Patent Office 3,290,687
Patented Dec. 6, 1966

3,290,687
COURSE BEACON SYSTEM TO PROVIDE DIRECTIONAL INFORMATION WITH THE AID OF TWO FREQUENCY-DEVIATION DIRECTIONAL RADIATION PATTERNS
Günter Höfgen, Berlin, Germany, assignor to International Standard Electric Corporation, New York, N.Y., a corporation of Delaware
Filed Aug. 20, 1963, Ser. No. 303,270
Claims priority, application Germany, Aug. 27, 1966, St 19,639
7 Claims. (Cl. 343—107)

Recently, a course beacon system has become known which provides directional information for the landing of aircraft, and is based on the Doppler principle. In this system the Doppler effect is produced in the course of scanning (coupling) linear antenna arrays. The following is a brief description of the method which is already known: Two linear antenna arrays are arranged symmetrically in relation to the landing runway. On these linear antenna arrays there is simulated a sinusoidal movement of the radiated energy by switching or commutating the individual antenna elements. Due to the Doppler effect produced in the case of moving transmitters, signal oscillations are received at the receiving end, which are frequency-modulated in the rhythm of the movement. The amount of the frequency deviation depends on the direction of the receiver in relation to the linear antenna array: Perpendicularly in relation to the linear antenna array the deviation equals zero, and reaches its maximum in the linear direction of the array. The direction dependence of the frequency deviation can be represented by a frequency deviation directional pattern. The two linear antenna arrays are fed with two signals of different power and frequency which are of such kind as to represent the carrier and one sideband of an amplitude-modulated signal. To each of the two linear antenna arrays, and on account of the movement, there is to be assigned one such deviation directional pattern which, in the aforementioned and most simple way of scanning or switching the linear antenna array with a sinusoidal course of movement, has a figure-of-eight characteristic. The patterns of both the carrier and the sideband are alike and symmetrical in relation to the centre line (on either side of a line of symmetry) between the linear antenna arrays. In the receiver, as a result of rectification, the low-frequency beat frequency is obtained which, as the difference between the carrier and the sideband signal, also contains the difference of the deviations resulting from the carrier and the sideband. The sinusoidal functions for the movement of the radiation on the linear antenna arrays are phase-shifted with respect to a sinusoidal reference signal by the same amount, but in an opposite sense. The signal produced in the discriminator from the resulting deviation, serves the navigation purpose by being compared with the reference signal. This is because it is dependent upon the receiving site either with respect to magnitude or phase, or both. Of particular interest is the phase relation. On the centre line between the two linear antenna arrays and with respect to the phase field, the phase shift in relation to the reference signal equals zero, and the lines of equal but opposite phase shift, extend symmetrically in relation to the centre line. To prevent the resulting frequency deviation as appearing at the discriminator, from dropping below the warning level of the receiver, it is possible to add an auxiliary frequency deviation by subjecting the transmitted signals to a frequency modulation. Also in this case the deviation directional patterns are required to be alike or of the same kind and image-symmetrical in relation to the centre line (on either side of a line of symmetry). This means to imply that the carrier as well as the sideband has to be frequency-modulated.

In contrast thereto, the present invention relates to the use of deviation directional patterns which are not alike and thus unsymmetrical with respect to both the carrier and the sideband. The invention, in particular, resides in the fact of frequency-modulating only one of the two signals, e.g. the sideband signal, for producing the desired auxiliary frequency deviation. The method will now be explained in detail with reference to the accompanying drawings, in which.

Figure 1:
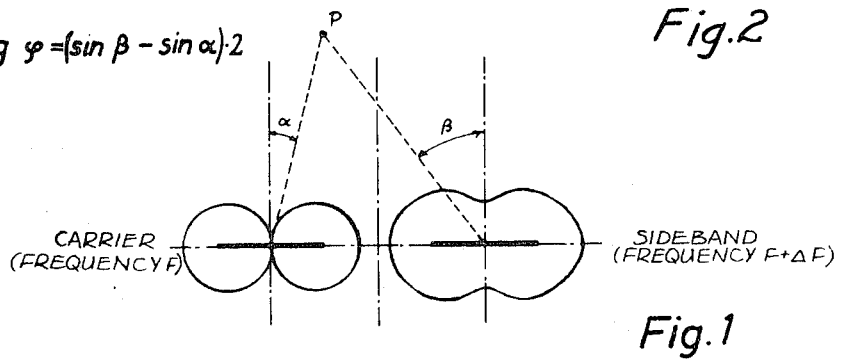
FIG. 1 is a sketch illustrating the directional patterns radiated by the individual antenna systems of the beacon system.

The reference signal is assumed to be described by the function $\sin \omega t$. The velocity of the moved radiation on the linear antenna arrays is assumed to be represented by two sinewave functions shifted by 90°, with the phase shift of the carrier signal being opposite in sense to that of the sideband signal (opposite phase relationship contained in the opposite-sense counting direction of the angles $\alpha$ and $\beta$). Moreover, the sideband signal is assumed to be frequency-modulated in an equal phase relation with the reference signal (frequency modulation index $m$). There will then be obtained the deviation directional patterns as shown in FIG. 1. The carrier signal $F_{Tr}$ perceptible at the receiving site P may be represented by the function:

$$F_{Tr} = F_0 \left(1 + \frac{V_{max.}}{c} \cdot \sin \alpha \cdot \cos \omega t \right)$$

wherein:

$\alpha$ is the angle between the receiving direction and the normal line with respect to the carrier-linear antenna array, $F_0$ the frequency of the transmitter wave by which the carrier-linear antenna array is blocked, $\omega$ the signal angular frequency, $V_{max.}$ the maximum velocity of the moved radiation in the direction of the linear antenna arrays, and $c$ is the velocity of light.

The sideband signal at P may be represented by the function:

$$F_{SB} = (F_0 + \Delta F_0)(1 + m \cdot \sin \omega t)\left(1 + \frac{V_{max.}}{c} \cdot \sin \beta \cdot \cos \omega t \right)$$

wherein:

$F_0 + \Delta F_0$ is the frequency of the transmitter signal as fed to the sideband linear antenna array, and $\beta$ is the angle between the receiving direction and the normal line with respect to the sideband linear antenna array.

The frequency deviation contained in the difference frequency, in an approximation, is as follows:

$$\Delta f = F_0 \cdot \frac{V_{max.}}{c} \left[ \left( (\sin \beta - \sin \alpha) \cos \omega t + m \cdot \frac{c}{V_{max.}} \cdot \sin \omega t \right) \right]$$

From this there will be obtained the determinative equation for the phase field:

$$tg \, \varphi = \frac{\sin \beta - \sin \alpha}{m \cdot \frac{c}{V_{max.}}}$$

wherein:

$\varphi$ is the phase angle of the signal oscillation with the angular frequency in relation to the reference signal.

Figure 2:
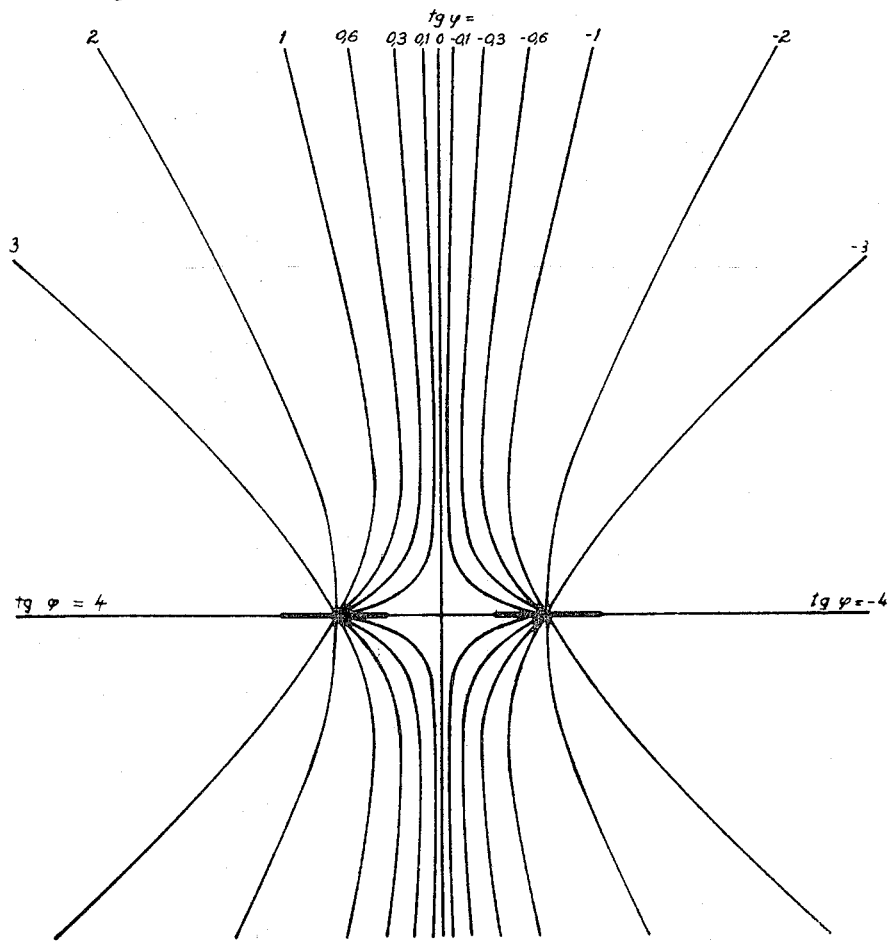
FIG. 2 is a graph of constant phase lines (isophase diagram)

In FIG. 2 the phase field is represented by way of lines having a constant phase ($tg\phi$=const.) with respect to $$m\frac{c}{V_{max.}} = \tfrac{1}{2}$$

The deviation is constant along the constant phase lines, hence independently of the distance. From the above it may be taken that equivalent, useful phase fields will result when using unsymmetrical frequency-deviation directional radiation patterns which are not alike, instead of symmetrical arrangements. The great advantage when using unsymmetrical frequency-deviation directional radiation patterns which are not alike, instead of symmetrical arrangements, resides in the fact of requiring fewer apparatus for producing the auxiliary frequency deviation, thus becoming more simple, because only one of the transmitted signals, e.g. the sideband signal, must be modulated and controlled with respect to its frequency.

Figure 3:
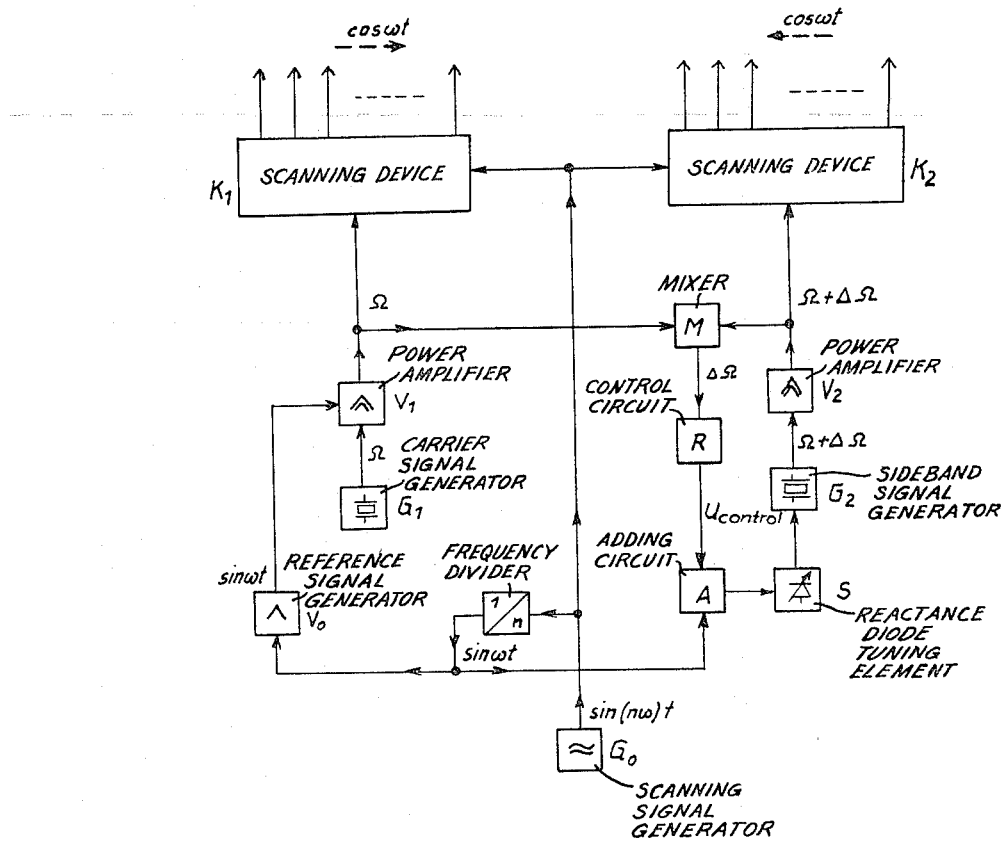
FIG. 3 is a block diagram of a course beacon system.

For example, the arrangement for a course beacon system to provide directional information with the aid of deviation-directional radiation patterns which are not alike and unsymmetrical, may be designed in a way as shown in FIG. 3.

The generator $G_1$ produces the carrier signal with the angular frequency $\Omega$. In the power amplifier stage $V_1$ the carrier signal is subjected to an amplitude modulation with the reference signal, and simultaneously to a power amplification. The thus modulated carrier signal as appearing at the output of the power amplifier stage $V_1$ is fed to the scanning device $K_1$.

A generator $G_2$ produces the sideband signal whose angular frequency $\Omega + \Delta\Omega$ each time depends on the capacitance of the reactance diode acting as the tuning element S of a frequency-control circuit. The sideband signal is amplified in the power amplifier stage $V_2$ and fed to the scanning device $K_2$. In order that the frequency difference between the carrier and the sideband signal may be kept constant at an exactly defined value it is necessary to provide a frequency-control circuit which is designed as follows: In the mixer stage M there is produced the difference signal between the carrier and the sideband signal. If the difference frequency $\Delta\Omega$ between the two frequencies deviates from the predetermined frequency value, then a corresponding control voltage is produced in the subsequently arranged control circuit R for acting via the adding circuit A upon the reactance diode serving as the tuning element S. In this way the sideband frequency is adapted to a predetermined frequency spacing in relation to the carrier frequency.

The two scanning devices $K_1$ and $K_2$ are of the same type. They are triggered by the scanning signal of the generator $G_0$. These scanning devices serve to apply the high-frequency carrier or sideband signal as applied to the input, in the proper order of succession to the individual antennae of the linear antenna systems each consisting of $n$ radiators, i.e. in such a way that on account of this there is simulated a movement of either the carrier or the sideband radiation on the linear antenna system in accordance with the time function $\cos \omega t$. The simulated movement of the sideband radiation is reciprocative in relation to that of the carrier radiation.

The reference signal with the time function $\sin \omega t$ is derived from the scanning signal of the generator $G_0$ by way of a frequency division carried out in the ratio $n:1$. It serves to effect the amplitude modulation of the carrier signal, and the frequency modulation of the sideband signal. To this end the modulation amplifier $V_0$ is inserted which allows the amplitude modulation of the carrier signal with the reference signal to be carried out in the carrier-power amplifier stage $V_1$. The frequency modulation of the sideband signal is effected in that the reference signal is additively superimposed upon the control voltage in the adding circuit A. The desired frequency modulation index may be obtained by varying the amplitude of the reference signal in the adding circuit A.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A directional determination system, comprising a first horizontal antenna array, means for generating signals and applying said signals to said first horizontal antenna array such that a first frequency-deviation directional pattern is created in space, a second horizontal antenna array, and means for generating signals and applying said signals to said second horizontal antenna array such that a second frequency-deviation directional pattern is created in space, said second pattern being of a different configuration than said first pattern.

2. A directional determination system, according to claim 1 wherein said means for generating signals and applying said signals to said first horizontal antenna array includes means for generating a carrier signal.

3. A directional determination system according to claim 2, wherein said means for generating signals and applying said signals to said second horizontal antenna array includes means for generating a sideband signal.

4. A directional determination system according to claim 3, further including means for frequency modulating said sideband signal.

5. A directional determination system according to claim 4, wherein said means for generating signals and applying said signals to said second horizontal antenna array includes means for cyclically applying said frequency modulated sideband signal to said horizontal antenna array.

6. A directional determination system according to claim 2, further including means for frequency modulating said carrier signal.

7. A directional determination system according to claim 2, wherein said means for generating signals and applying said signals to said first horizontal antenna array includes means for cyclically applying said carrier signal to said first horizontal antenna array.

References Cited by the Examiner
UNITED STATES PATENTS

| | | | |
|---|---|---|---|
| 2,543,081 | 2/1951 | Watts et al. | 343—107 X |
| 2,593,485 | 4/1952 | Pickles et al. | 343—107 |
| 2,613,348 | 10/1952 | Stodola | 343—107 X |
| 3,064,929 | 11/1962 | Gard | 343—103 |
| 3,130,407 | 4/1964 | Kramar | 343—107 |
| 3,191,175 | 6/1965 | Battle et al. | 343—108 |
| 3,234,554 | 2/1966 | Earp et al. | 343—106 |

CHESTER L. JUSTUS, *Primary Examiner.*

H. C. WAMSLEY, *Assistant Examiner.*